United States Patent
Wu et al.

(10) Patent No.: US 11,151,392 B2
(45) Date of Patent: Oct. 19, 2021

(54) METHOD AND APPARATUS FOR CAMERA CALIBRATION PROCESSING, DEVICE FOR VEHICLE CONTROL AND STORAGE MEDIUM

(71) Applicant: BEIJING BAIDU NETCOM SCIENCE TECHNOLOGY CO., LTD., Beijing (CN)

(72) Inventors: Tong Wu, Beijing (CN); Gaifan Li, Beijing (CN); Xun Zhou, Beijing (CN); Shirui Li, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 87 days.

(21) Appl. No.: 16/716,353

(22) Filed: Dec. 16, 2019

(65) Prior Publication Data
US 2020/0193171 A1    Jun. 18, 2020

(30) Foreign Application Priority Data

Dec. 17, 2018    (CN) .......................... 201811543203.X (51) Int. Cl.
*G06K 9/00*    (2006.01)
*B60R 1/00*    (2006.01)
(Continued)

(52) U.S. Cl.
CPC ............ *G06K 9/00791* (2013.01); *B60R 1/00* (2013.01); *G06K 9/209* (2013.01); *G06T 7/80* (2017.01);
(Continued)

(58) Field of Classification Search
CPC .............. G06K 9/00791; G06K 9/209; G06K 9/00798; G06K 9/00812; G06T 7/80;
(Continued)

(56) References Cited

U.S. PATENT DOCUMENTS

2010/0235129 A1    9/2010  Sharma
2014/0205046 A1*   7/2014  Morikawa .............. G09G 5/006
                                                                  375/354
(Continued)

FOREIGN PATENT DOCUMENTS

CN    103148832 A    6/2013
CN    103646403 A    3/2014
(Continued)

OTHER PUBLICATIONS

Notice of Allowance of the priority CN application No. 201811543203X.
(Continued)

*Primary Examiner* — Alexander Gee
(74) *Attorney, Agent, or Firm* — J.C. Patents (57) ABSTRACT

Embodiments of the present disclosure provide a method and an apparatus for camera calibration processing, a device for vehicle control and a storage medium. In the method according to the embodiments of the present disclosure, at least one pair of images collected by a camera and a vehicle position at a collection time of each of the images are acquired during a process of a vehicle travelling along a straight line, where each pair of images includes images taken by the camera at two different positions, and two images in each pair of images include a common static feature point. A current installation angle of the camera is calculated according to the at least one pair of images and the vehicle position at the collection time of each of the images.

11 Claims, 3 Drawing Sheets

(51) Int. Cl.
*G06K 9/20* (2006.01)
*G06T 7/80* (2017.01)
*G06T 7/246* (2017.01)

(52) U.S. Cl.
CPC ............... B60R 2300/402 (2013.01); *G06T 2207/30252* (2013.01)

(58) Field of Classification Search
CPC . G06T 2207/30252; G06T 2207/30256; B60R 1/00; B60R 2300/402; B60R 2300/00; B60R 2300/804; B60R 2300/8086; B60R 11/04; B60K 2370/21
See application file for complete search history.

(56) References Cited

U.S. PATENT DOCUMENTS

| | | | |
|---|---|---|---|
| 2016/0121806 A1* | 5/2016 | Lee | G06T 7/80 348/148 |
| 2016/0364863 A1 | 12/2016 | Hansson | |
| 2017/0003134 A1* | 1/2017 | Kim | G08G 1/09626 |
| 2017/0160824 A1* | 6/2017 | Ma | G06F 3/0416 |
| 2018/0165833 A1* | 6/2018 | Inoue | G06T 3/00 |

FOREIGN PATENT DOCUMENTS

| | | |
|---|---|---|
| CN | 106651963 A | 5/2017 |
| CN | 107481292 A | 12/2017 |
| CN | 107728646 A | 2/2018 |
| CN | 107878325 A | 4/2018 |
| CN | 108235777 A | 6/2018 |
| CN | 108364320 A | 8/2018 |
| CN | 108876857 A | 11/2018 |

OTHER PUBLICATIONS

The first Office Action of the priority CN application No. 201811543203X.

* cited by examiner

METHOD AND APPARATUS FOR CAMERA CALIBRATION PROCESSING, DEVICE FOR VEHICLE CONTROL AND STORAGE MEDIUM

CROSS-REFERENCE TO RELATED APPLICATION

This application claims priority to Chinese Patent Application No. 201811543203.X, filed on Dec. 17, 2018, which is hereby incorporated by reference in its entirety.

TECHNICAL FIELD

Embodiments of the disclosure relates to the field of driverless technology, and in particular, to a method and an apparatus for camera calibration processing, a device for vehicle control and a storage medium.

BACKGROUND

As operation time of driverless vehicle increases, due to various external reasons, a camera installed on the driverless vehicle would certainly have different degrees of angle deviation. If the angle deviation of the camera exceeds a tolerance range, a perception accuracy of a driverless system will be seriously affected, resulting in serious malfunction or safety incident. Therefore, there is an urgent need for a technical solution for efficiently checking an installation angle of the camera on the driverless vehicle.

SUMMARY

Embodiments of the present disclosure provide a method and an apparatus for camera calibration processing, a device for vehicle control and a storage medium, in order to solve the problem that a perception accuracy of a driverless system will be seriously affected when angle deviation of a camera of an existing driverless vehicle exceeds a tolerance range, resulting in serious malfunction or safety incident.

In a first aspect of the embodiments of the present disclosure, a method for camera calibration processing is provided, which includes:

acquiring, during a process of a vehicle travelling along a straight line, at least one pair of images collected by a camera, and a vehicle position at a collection time of data of each of the images, where data of each pair of images includes data of images taken by the camera at two different positions, and two images in each pair of images include a common static feature point;

calculating a current installation angle of the camera, according to the at least one pair of images and the vehicle position at the collection time of each of the images;

determining whether an installation angle error of the camera is within a preset error range; and taking a preset processing measure, when the installation angle error of the camera is not within the preset error range.

In another aspect of the embodiments of the present disclosure, an apparatus for camera calibration processing is provided, which includes:

a data acquiring module, configured to acquire, during a process of a vehicle travelling along a straight line, at least one pair of images collected by a camera, and a vehicle position at a collection time of each of the images, where each pair of images includes images taken by the camera at two different positions, and two images in each pair of images include a common static feature point;

a calibration calculating module, configured to calculate a current installation angle of the camera, according to the at least one pair of images and the vehicle position at the collection time of each of the images; and a calibration processing module, configured to:

determine whether an installation angle error of the camera is within a preset error range; and take a preset processing measure, when the installation angle error of the camera is not within the preset error range.

In another aspect of the embodiments of the present disclosure, a device for vehicle control is provided, which includes:

a memory, a processor, and a computer program stored on the memory and executable on the processor, where when the computer program is executed by the processor, the above method for camera calibration processing is implemented.

In another aspect of the embodiments of the present disclosure, a computer readable storage medium, having a computer program stored thereon, where when the computer program is executed by a processor, the above method for camera calibration processing is implemented.

According to the method and apparatus for camera calibration processing, the device for vehicle control and the storage medium according to the embodiments of the present disclosure, the at least one pair of images collected by the camera and the vehicle position at the collection time of each of the images are acquired during the process of the vehicle travelling along the straight line, where each pair of images includes the images taken by the camera at two different positions, and the two images in each pair of images include the common static feature point. The current installation angle of the camera is calculated according to the at least one pair of images and the vehicle position at the collection time of each of the images. The installation angle of the camera is detected in real time by performing calibration processing on the camera of the operational driverless vehicle in real time, and further it is decided whether the installation angle of the camera is within the error range, so that the effectiveness of the installation of the camera is checked in real time, which can improve the safety of the driverless vehicle.

Specific embodiments of the present disclosure are illustrated through the above-mentioned drawings, and a more detailed description thereof will be described later. The drawings and description are not intended, by any means, to limit the scope of the conception of the embodiments of the present disclosure, instead, they are intended to illustrate the concepts of the present disclosure for those skilled in the art by referring to the specific embodiments.

DETAILED DESCRIPTION OF THE EMBODIMENTS

Exemplary embodiments will be described in detail herein, examples of which are illustrated in the drawings. Unless otherwise indicated, same numerals in different drawings indicate the same or similar elements, when drawing are referred to in the following description. Implementations described in the following exemplary embodiments do not represent all implementations consistent with embodiments of the disclosure. Instead, they are merely examples of apparatuses and methods consistent with some aspects of the embodiments of the disclosure as detailed in the appended claims.

The terms "first", "second", and the like, which are referred to in the embodiments of the present disclosure, are only used for the purpose of description, and they cannot be construed as indicating or implying a relative importance or implicitly indicating the number of technical features indicated. In the following description of the respective embodiments, the meaning of "a plurality of" is two or more, unless specifically defined otherwise.

The following specific embodiments may be combined with each other, and the same or similar concepts or processes may not be repeated in some embodiments. Embodiments of the present disclosure will be described below with reference to the drawings.

Embodiment 1

Figure 1:
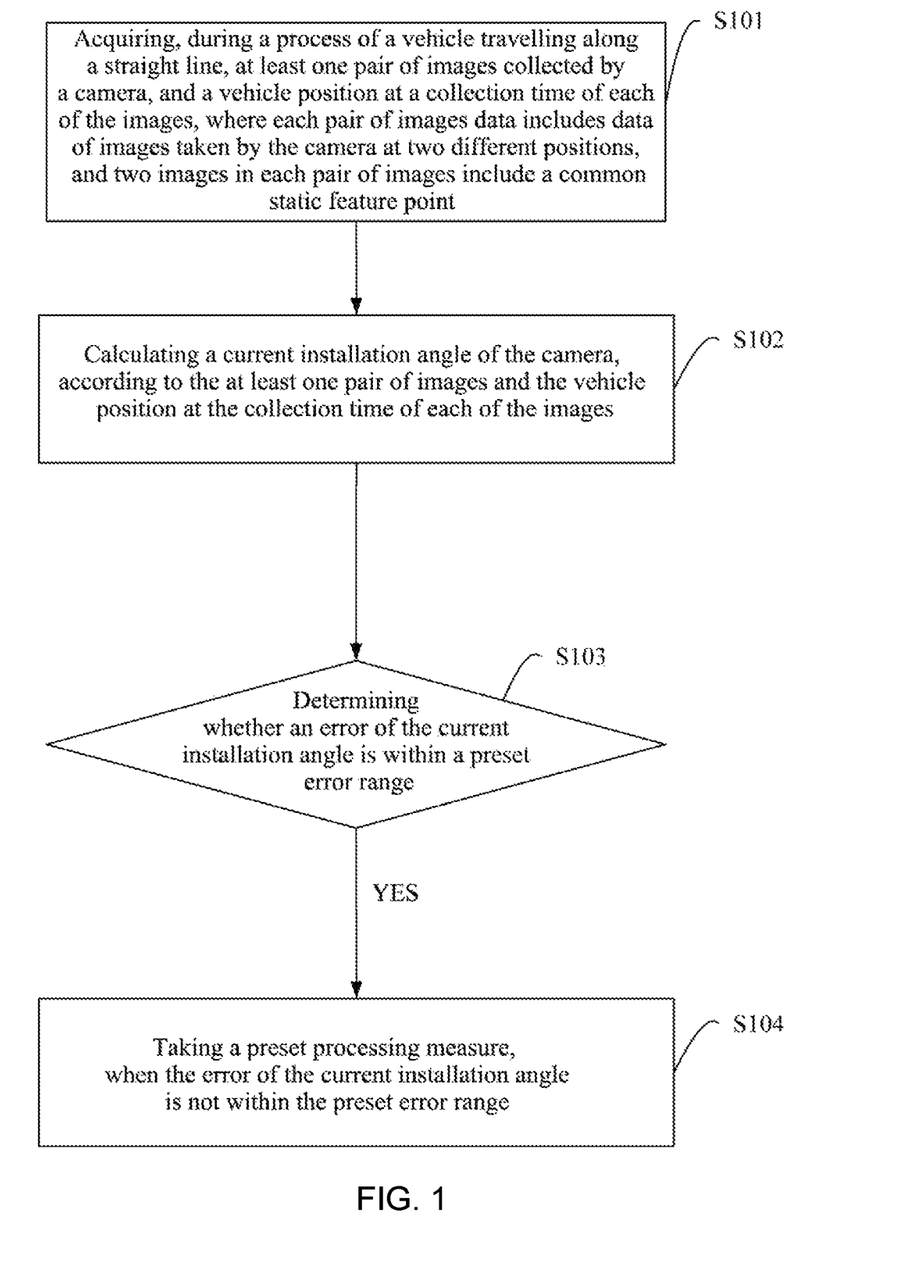
FIG. 1 is a flowchart of a method for camera calibration processing according to Embodiment 1 of the present disclosure.

FIG. 1 is a flowchart of a method for camera calibration processing according to Embodiment 1 of the present disclosure. In this embodiment, a method for camera calibration processing is provided for the problem that a perception accuracy of a driverless system will be seriously affected when angle deviation of the camera of an existing driverless vehicle exceeds a tolerance range, resulting in serious malfunction or safety incident.

The method according to this embodiment is applied to a control device of a driverless vehicle, which may be an in-vehicle terminal of the driverless vehicle. In other embodiments, the method may also be applied to other devices. In this embodiment, the in-vehicle terminal is taken as an example for schematic illustration.

As shown in FIG. 1, the specific steps of the method are as follows:

Step S101: acquiring, during a process of a vehicle travelling along a straight line, at least one pair of images collected by a camera, and a vehicle position at a collection time of each of the images, where each pair of images includes images taken by the camera at two different positions, and two images in each pair of images include a common static feature point.

An in-vehicle terminal controls the vehicle to travel along the straight line within a preset speed range, and to acquire the at least one pair of images collected by the camera and the vehicle position at the collection time of each of the images during the process of the vehicle travelling along the straight line. The each pair of images includes images taken by the camera at two different positions, and two images in each pair of images include the common static feature point.

During the travelling of the vehicle, if a travelling speed of the vehicle is too fast, quality of the images taken by the camera are poor, and there would be a big error, and if the travelling speed of the vehicle is too slow, a difference between the images taken by the camera in a short period of time is too small, which is disadvantageous to the calculation of the camera installation angle. Therefore, the traveling speed of the vehicle may be limited to a preset speed range, and the preset speed range is used to define a relatively slow speed of the vehicle, which may be 5-15 km/h, etc., and the preset speed range may be set by a person skilled in the art according to an actual scenario and his/her experience, which will not be specifically limited in this embodiment.

Specifically, during the process of the vehicle travelling along the straight line, the in-vehicle terminal acquires, in real time, original data collected by the camera and vehicle positioning data collected by a positioning apparatus. After the original data collected by the camera and the vehicle positioning data collected by the positioning apparatus are acquired, the in-vehicle terminal may sample the original data collected by the camera to obtain the at least one pair of images, and determine a vehicle position at a collection time of each of the images, according to the collection time of each of the images (for example, a timestamp of the image) and the vehicle positioning data.

Since the vehicle travels along the straight line, vehicle positions corresponding to different collection times are different. For any pair of images, as long as the collection times of the two images are different, positions of the camera at the collection times of the two images are different, that is, these two images are the data of images taken by the camera at two different positions.

In addition, in order to make each pair of images include a common static feature point, a sampling frequency can be controlled during obtaining each pair of images by sampling, such that a time interval between the sampling times of each pair of images is less than a preset time threshold, that is, a time interval between the collection times of each pair of images is less than the preset time threshold.

A preset time interval may be set by a person skilled in the art according to an actual scenario, a vehicle speed and an experience value, so that there is an overlapping region between the two images taken by the camera at times that are separated by the preset time interval, that is, the two images in each of the two images taken by the camera at the times that are separated by the preset time interval have the static feature point. The preset time interval will not be specifically limited in this embodiment.

Step S102: calculating a current installation angle of the camera, according to the at least one pair of images and the vehicle position at the collection time of each of the images.

After the at least one pair of images collected by the camera and the vehicle position at the collection time of each of the images are acquired, the installation angle of the camera may be calculated according to each pair of images and vehicle positions at collection times thereof, and thereby at least one installation angle of the camera can be obtained, and a high-confidence installation angle of the camera can be obtained by combining the at least one installation angle.

In addition, in this embodiment, the installation angle of the camera may include one or more of a yaw angle, a pitch angle, and a roll angle of the camera, or the installation angle of the camera may be a relative angle with respect to the vehicle, which will not be specifically limited herein.

Step S103: determining whether an error of the current installation angle is within a preset error range.

After the installation angle error of the camera is obtained, it is determined whether the error of the current installation angle is within the preset error range.

If the error of the current installation angle is within the preset error range, it is indicated that a deviation of the current installation angle of the camera from a calibration installation angle is not big and is within an acceptable range, which would not have a great impact on the perception accuracy of the driverless vehicle, and can be left unprocessed.

If the error of the current installation angle is not within the preset error range, it is indicated that the deviation of the current installation angle of the camera from the calibration installation angle is big and exceeds the acceptable range, which would have a great impact on the perception accuracy of the driverless vehicle, and then Step S104 is performed to take a preset processing measure.

The preset error range may be set or adjusted by a person skilled in the art according to an actual application scenario and experience, which will not be specifically limited in this embodiment.

Step S104: taking a preset processing measure, when the error of the current installation angle is not within the preset error range.

If the error of the current installation angle is not within the preset error range, it is indicated that the deviation of the current installation angle of the camera from the calibration installation angle is big and exceeds the acceptable range, which would have a great impact on the perception accuracy of the driverless vehicle. In this step, the in-vehicle terminal takes the preset processing measure to avoid serious malfunctions and safety incidents of the driverless vehicle caused by the angle deviation of the camera exceeding a tolerance range.

In addition, the preset processing measure may be set by a person skilled in the art according to an actual application scenario and experience, which will not be specifically limited in this embodiment.

In this embodiment, the driverless vehicle may be a vehicle that is put into operation. Generally, there are many static obstacles in any operation site. The in-vehicle terminal controls the driverless vehicle to travel along the straight line for certain distance at the speed within the preset range, when it is required to detect whether there is a big angle deviation of the installation angle of the camera, and the installation angle of the camera can be calculated according to images collected by the camera and the vehicle positioning the positioning apparatus. It can be determined whether the installation angle of the camera is within an error range by simply comparing the obtained installation angle with the calibration installation angle, so that the effectiveness of the installation of the camera can be determined.

In this embodiment of the present disclosure, at least one pair of images collected by the camera and the vehicle position at the collection time of each of the images are acquired during the process of the vehicle travelling along the straight line, where each pair of images includes images taken by the camera at two different positions, and the two images in each pair of images include the common static feature point. The current installation angle of the camera is calculated according to the at least one pair of images and the vehicle position at the collection time of each of the images. The installation angle of the camera is detected in real time by performing calibration processing on the camera of the operational driverless vehicle in real time, and further it is determined whether the installation angle of the camera is within the error range by simply comparing the obtained installation angle with the calibration installation angle, so that the effectiveness of the installation of the camera is checked in real time, which can improve the safety of the driverless vehicle.

Embodiment 2

Figure 2:
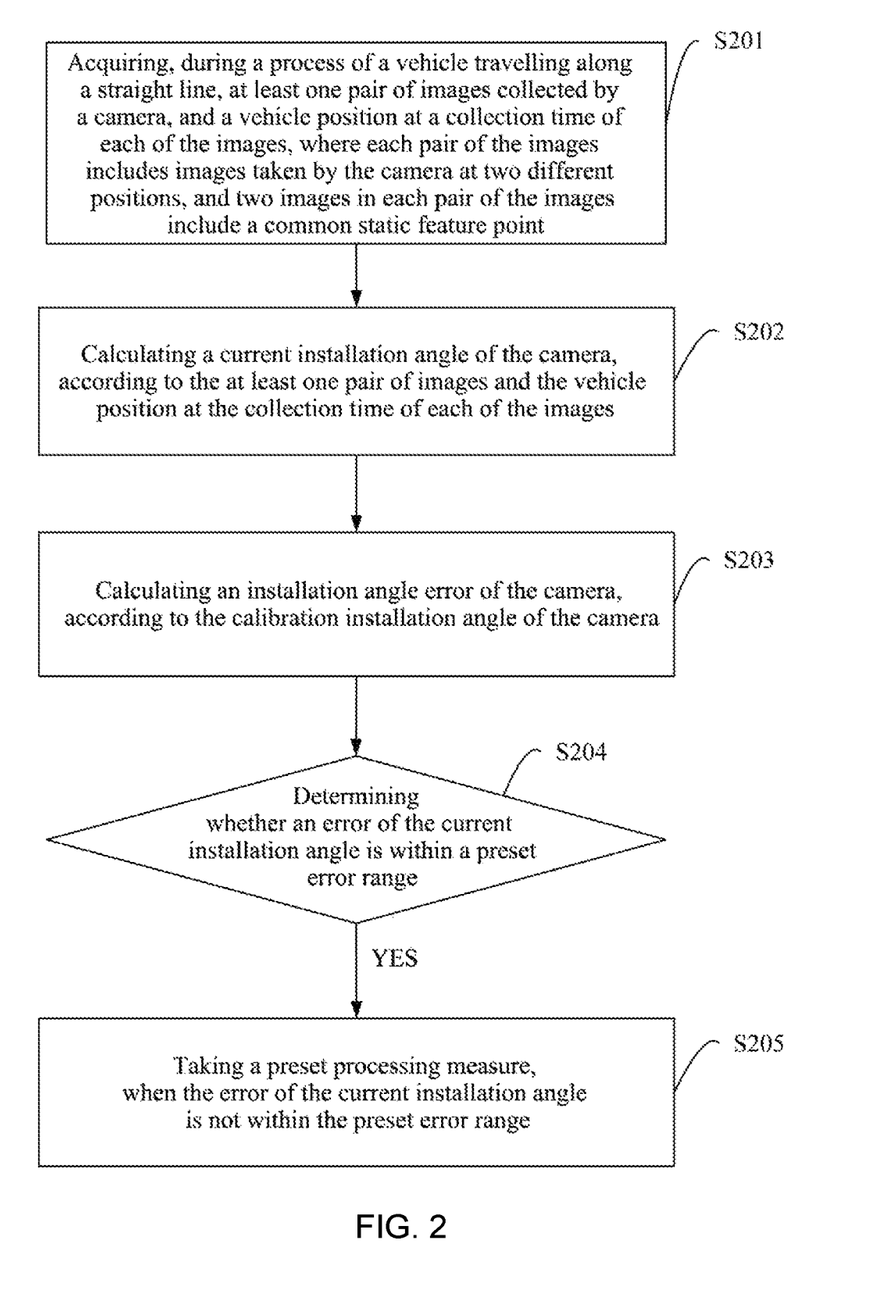
FIG. 2 is a flowchart of a method for camera calibration processing according to Embodiment 2 of the present disclosure.

FIG. 2 is a flowchart of a method for camera calibration processing according to Embodiment 2 of the present disclosure. On the basis of the Embodiment 1, in this embodiment, as shown in FIG. 2, the specific steps of the method are as follows:

Step S201: acquiring, during a process of a vehicle travelling along a straight line, at least one pair of images collected by a camera, and a vehicle position at a collection time of each of the images, where each pair of images includes images taken by the camera at two different positions, and two images in each pair of images include a common static feature point.

In this embodiment, the acquiring, during a process of a vehicle travelling along a straight line, at least one pair of images collected by a camera may specifically be implemented as following:

acquiring original data collected by the camera, during the process of the vehicle travelling along the straight line; and sampling the original data according to a preset sampling frequency to acquire the at least one pair of images, where each pair of images includes data of images sampled at two different sampling times, and the two images in each pair of images include the common static feature point.

Optionally, a feasible implementation of the sampling the original data according to a preset sampling frequency to acquire the at least one pair of images is:

sampling the original data according to the preset sampling frequency to acquire 2N images, and dividing the 2N images into N pairs to acquire N pairs of images, where each pair of images includes images obtained by sampling at two adjacent sampling times, and the two images in each pair of image include the common static feature point.

An order of the collection times of the 2N images is the same as an order of the sampling times. The shorter a time interval between the collection times is, the more the common static feature points between the two image data are, and therefore, the images obtained by sampling at two adjacent sampling times are taken as a pair of images, so that the two images in each pair of images have more common static feature point.

For example, sequentially sampling out 100 images, P1, P2, . . . , P100, from the original data according to the sampling frequency, where an order of timestamps of the 100 images is the same as the sampling order. And the data of the 100 images is divided into 50 pairs: P1 and P2, P3 and P4, . . . , P99 and P100, to obtain 50 pairs of images.

In addition, in order to make the two images in each pair of images include the common static feature point, a sampling frequency can be controlled during obtaining each pair of images by sampling, such that a time interval between the sampling times of each pair of images is less than a preset time threshold, that is, a time interval between the collection times of each pair of images is less than the preset time threshold.

Optionally, a feasible implementation of the sampling the original data according to a preset sampling frequency to acquire the at least one pair of images is:

repeating sampling processing on the original data for N times to acquire N pairs of images, where N is a positive integer, and where the sampling processing includes: sampling out one pair of images from the original data, where a time interval between collection times of the pair of images is less than a preset time threshold, so that the two images in each pair of images include the common static feature point.

The sampling frequency and the preset time threshold may be set by a person skilled in the art according to an actual scenario, a vehicle speed and an experience value, so that there is an overlapping region between two images taken by the camera at times that are separated by the preset time interval, that is, the two images taken by the camera at the times that are separated by the preset time threshold have the common static feature point. The preset time threshold will not be specifically limited in this embodiment.

In this embodiment, the acquiring, during a process of a vehicle travelling along a straight line, a vehicle position at a collection time of each of the images may specifically be implemented as following:

acquiring vehicle positioning data collected by a positioning apparatus in real time, during the process of the vehicle travelling along the straight line; and determining the vehicle position at the collection time of each of the images, according to the collection time of each of the images and the vehicle positioning data collected by the positioning apparatus in real time.

During the travelling of the vehicle, if a travelling speed of the vehicle is too fast, quality of the images taken by the camera is poor, and there would be a big error, and if the travelling speed of the vehicle is too slow, a difference between the images taken by the camera in a short period of time is too small, which is not disadvantageous to the calculation of the camera installation angle. Therefore, the traveling speed of the vehicle may be limited to a preset speed range, and the preset speed range is used to define a relatively slow speed of the vehicle, which may be 5-15 km/h, etc., and the preset speed range may be set by a person skilled in the art according to an actual scenario and his/her experience, which will not be specifically limited in this embodiment.

Since the vehicle travels along the straight line, vehicle positions corresponding to different collection times are different. For any pair of images, as long as collection times of the two images are different, positions of the camera at the collection times of the two images are different, that is, these two images are images taken by the camera at two different positions.

Optionally, the in-vehicle terminal is further configured to control the vehicle where the camera is located, to travel along the straight line at the speed within the preset speed range, when a calibration processing instruction of the camera is received.

Step S202: calculating a current installation angle of the camera, according to the at least one pair of images and the vehicle position at the collection time of each of the images.

After the at least one pair of images collected by the camera and the vehicle position at the collection time of each of the images are acquired, the installation angle of the camera may be calculated according to each pair of images and vehicle positions at collection times thereof, and thereby at least one installation angle of the camera can be obtained, and a high-confidence installation angle of the camera can be obtained by combining the at least one installation angle.

The greater a number of pairs of the image data is, the higher the confidence of the current installation angle of the camera is.

Specifically, this step may be implemented as following:

calculating a current installation angle of the camera respectively according to each pair of images and the vehicle position at the collection time of each of the images, to obtain at least one installation angle of the camera; and calculating an average value of the at least one installation angle, to obtain the current installation angle of the camera.

In this embodiment, each pair of images is two images that are taken by the camera at two different positions and have the common static feature point. Optical axes of the camera when shooting the two images are parallel to each other since the vehicle travels along the straight line, and the internal parameters of the camera are completely identical. An external parameter of the camera can be calibrated according to each pair of images and the vehicle position at the collection time of each pair of images, using an existing calibration method of the camera external parameter, and the installation angle of the camera relative to the vehicle can be calculated according to the external parameter of the camera.

In addition, the calculating a current installation angle of the camera according to each pair of images and the vehicle position at the collection time of each of the images, to obtain at least one installation angle of the camera may be implemented in another manner, which will not be limited in this embodiment.

In this embodiment, the driverless vehicle may be a vehicle that is put into operation. Generally, there are many static obstacles in any operation site. The in-vehicle terminal controls the driverless vehicle to travel along the straight line for certain distance at the speed within the preset range, when it is required to detect whether there is a big angle deviation of the installation angle of the camera, and the installation angle of the camera can be calculated according to images collected by the camera and the vehicle positioning the positioning apparatus. And subsequently, it can be determined whether the installation angle of the camera is within an error range by simply comparing the obtained installation angle with the factory calibration installation angle, so that the effectiveness of the installation of the camera can be determined.

Step S203: calculating an installation angle error of the camera, according to the calibration installation angle of the camera.

After the current installation angle of the camera is obtained through calculation, an error of the current installation angle of the camera is calculated according to the calibration installation angle of the camera, to obtain the installation angle error of the camera.

Optionally, the installation angle error of the camera may be a difference between the current installation angle and the calibration installation angle, or the installation angle error may be an error obtained through calculation using a preset error algorithm, according to the current installation angle obtained through calculation and the calibration installation angle. The preset error algorithm may be set by a person skilled in the art according to an actual application scenario and experience, which will not be specifically limited in this embodiment.

Step S204: determining whether an error of the current installation angle is within a preset error range.

After the installation angle error of the camera is obtained, it is determined whether the error of the current installation angle is within the preset error range.

If the error of the current installation angle is within the preset error range, it is indicated that a deviation of the current installation angle of the camera from a calibration installation angle is not big and is within an acceptable range, which would not have a great impact on the perception accuracy of the driverless vehicle, and can be left unprocessed.

If the error of the current installation angle is not within the preset error range, it is indicated that the deviation of the current installation angle of the camera from the calibration installation angle is big and exceeds the acceptable range, which would have a great impact on the perception accuracy of the driverless vehicle, and then Step S205 is performed to take a preset processing measure.

The preset error range may be set or adjusted by a person skilled in the art according to an actual application scenario and experience, which will not be specifically limited in this embodiment.

Step S205: taking a preset processing measure, when the error of the current installation angle is not within the preset error range.

If the error of the current installation angle is not within the preset error range, it is indicated that the deviation of the current installation angle of the camera from the calibration installation angle is big and exceeds the acceptable range, which would have a great impact on the perception accuracy of the driverless vehicle. In this step, the in-vehicle terminal takes the preset processing measure to avoid serious malfunctions and safety incidents of the driverless vehicle caused by the angle deviation of the camera exceeding a tolerance range.

In addition, the preset processing measure may be set by a person skilled in the art according to an actual application scenario and experience, which will not be specifically limited in this embodiment.

Optionally, if the error of the current installation angle is not within the preset error range, the in-vehicle terminal may control the vehicle to issue warning information to a designated user terminal device or a remote control, to prompt a relevant person to recalibrate the camera of the vehicle.

Optionally, if the error of the current installation angle is not within the preset error range, the in-vehicle terminal may also control the vehicle to automatically recalibrate the installation angle or external parameter of the camera of the vehicle.

In this embodiment of the present disclosure, the at least one pair of images collected by the camera and the vehicle position at the collection time of each of the images are acquired during the process of the vehicle travelling along the straight line, where each pair of the images includes images taken by the camera at two different positions, and of the two images in each pair of images include the common static feature point. The current installation angle of the camera is calculated according to the at least one pair of images and the vehicle position at the collection time of each of the images. The installation angle of the camera is detected in real time by performing calibration processing on the camera of the operational driverless vehicle in real time, and further it is determined whether the installation angle of the camera is within the error range by simply comparing the obtained installation angle with the calibration installation angle, so that the effectiveness of the installation of the camera is checked in real time, which can improve the safety of the driverless vehicle.

Embodiment 3

Figure 3:
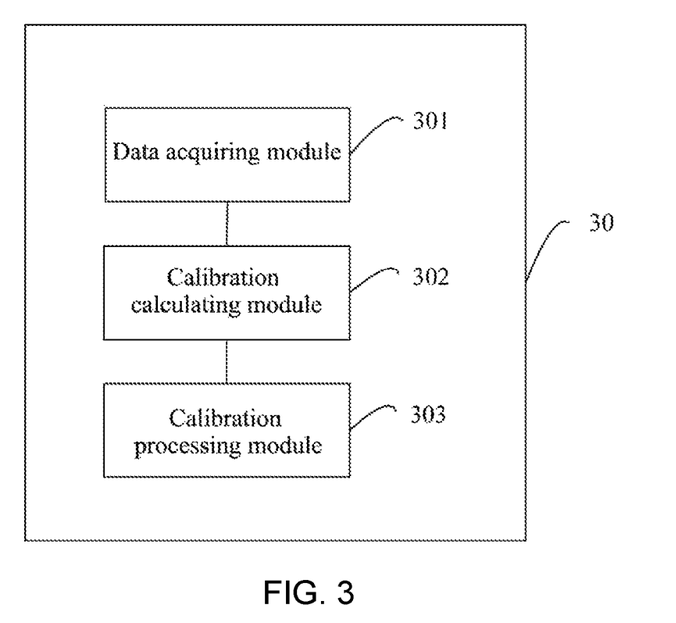
FIG. 3 is a schematic structural diagram of an apparatus for camera calibration processing according to Embodiment 3 of the present disclosure.

FIG. 3 is a schematic structural diagram of an apparatus for camera calibration processing according to Embodiment 3 of the present disclosure. The apparatus for camera calibration processing according to this embodiment of the present disclosure may perform the processing flow according to the embodiment of the method for camera calibration processing. As shown in FIG. 3, the apparatus for camera calibration processing 30 includes: a data acquiring module 301, a calibration calculating module 302, a calibration processing module 303.

Specifically, the data acquiring module 301 is configured to acquire, during a process of a vehicle travelling along a straight line, at least one pair of images collected by a camera, and a vehicle position at a collection time of each of the images, where each pair of images includes images taken by the camera at two different positions, and two images in each pair of images include a common static feature point.

The calibration calculating module 302 is configured to calculate a current installation angle of the camera, according to the at least one pair of images and the vehicle position at the collection time of each of the images.

The calibration processing module 303 is configured to calculate an installation angle error of the camera, according to the calibration installation angle of the camera; determine whether the installation angle error of the camera is within a preset error range; and take a preset processing measure, when the installation angle error of the camera is not within the preset error range.

The apparatus according to this embodiment of the present disclosure may be specifically configured to perform the method embodiment according to Embodiment 1, and the functions of the apparatus will not be repeated herein.

In this embodiment of the present disclosure, the at least one pair of images collected by the camera and the vehicle position at the collection time of each of the images are acquired during the process of the vehicle travelling along the straight line, where each pair of images includes data of images taken by the camera at two different positions, and the two image in each pair of images include the common static feature point. The current installation angle of the camera is calculated according to the at least one pair of images and the vehicle position at the collection time of each of the images. The installation angle of the camera is detected in real time by performing calibration processing on the camera of the operational driverless vehicle in real time, and it is further determined whether the installation angle of the camera is within the error range by simply comparing the obtained installation angle with the calibration installation angle, so that the effectiveness of the installation of the camera is checked in real time, which can improve the safety of the driverless vehicle.

Embodiment 4

On the basis of the Embodiment 3, in this embodiment, a calibration processing module is further configured to:

control the vehicle to issue warning information, when the installation angle error of the camera is not within the preset error range.

Optionally, the data acquiring module is further configured to:

acquire original data collected by the camera, during the process of the vehicle travelling along the straight line; and sample the original data according to a preset sampling frequency to acquire the at least one pair of images, where each pair of images includes images sampled at two different sampling times, and the two images in each pair of images include the common static feature point.

Optionally, the data acquiring module is further configured to:

sample the original data according to the preset sampling frequency to acquire 2N images, where N is a positive integer; and divide the 2N images into N pairs to acquire N pairs of images, where each pair of images includes images obtained by sampling at two adjacent sampling times, and the two images in each pair of images include the common static feature point.

Optionally, the data acquiring module is further configured to:

repeat sampling processing on the original data for N times to acquire N pairs of images, where N is a positive integer, and the sampling processing includes: sampling out one pair of images from the original data, where a time interval between collection times of the pair of images is less than a preset time threshold, so that the two images in each pair of images include the common static feature point.

Optionally, the data acquiring module is further configured to:

acquire vehicle positioning data collected by a positioning apparatus in real time, during the process of the vehicle travelling along the straight line; and determine the vehicle position at the collection time of each of the images, according to the collection time of each of the images and the vehicle positioning data collected by the positioning apparatus in real time.

Optionally, the calibration calculating module is further configured to:

calculate an installation angle of the camera respectively according to each pair of images and the vehicle position at the collection time of each of the images, to obtain at least one installation angle of the camera; and calculate an average value of the at least one installation angle, to obtain the current installation angle of the camera.

The apparatus according to this embodiment of the present disclosure may be specifically configured to perform the method embodiment according to Embodiment 2, and the functions of the apparatus will not be repeated herein.

In this embodiment of the present disclosure, the at least one pair of images collected by the camera and the vehicle position at the collection time of each of the images are acquired during the process of the vehicle travelling along the straight line, where each pair of images includes images taken by the camera at two different positions, and the two images in each pair of images include the common static feature point. The current installation angle of the camera is calculated according to the at least one pair of images and the vehicle position at the collection time of each of the images. The installation angle of the camera is detected in real time by performing calibration processing on the camera of the operational driverless vehicle in real time, and further it is determined whether the installation angle of the camera is within the error range by simply comparing the obtained installation angle with the calibration installation angle, so that the effectiveness of the installation of the camera is checked in real time, which can improve the safety of the driverless vehicle.

Embodiment 5

Figure 4:
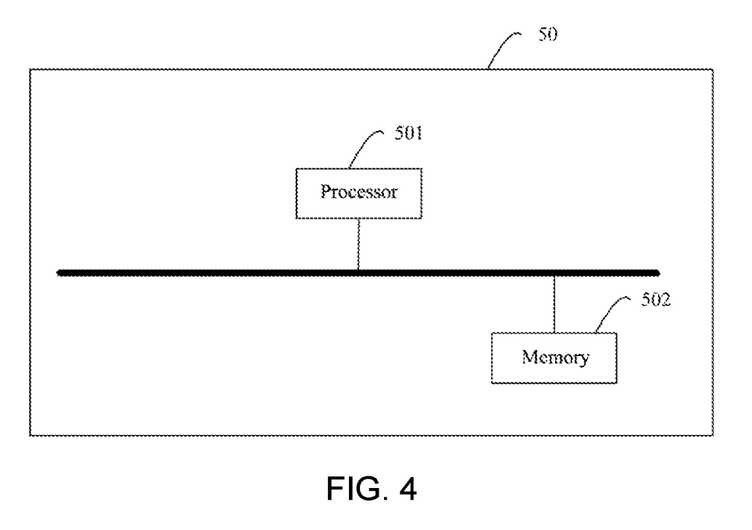
FIG. 4 is a schematic structural diagram of a device for vehicle control according to Embodiment 5 of the present disclosure.

FIG. 4 is a schematic structural diagram of a device for vehicle control according to Embodiment 5 of the present disclosure. As shown in FIG. 4, the device for vehicle control 50 includes: a processor 501, a memory 502, and a computer program stored on the memory 502 and executable on the processor 501.

The processor 501 implements the method for camera calibration processing according to any one of the above method embodiments when executing the computer program stored on the memory 502.

In this embodiment of the present disclosure, the at least one pair of images collected by the camera and the vehicle position at the collection time of each of the images are acquired during the process of the vehicle travelling along the straight line, where each pair of images includes the images taken by the camera at two different positions, and of the two images in each pair of images include the common static feature point. The current installation angle of the camera is calculated according to the at least one pair of image data and the vehicle position at the collection time of each of the images. The installation angle of the camera is detected in real time by performing calibration processing on the camera of the operational driverless vehicle in real time, and further it is determined whether the installation angle of the camera is within the error range by simply comparing the obtained installation angle with the calibration installation angle, so that the effectiveness of the installation of the camera is checked in real time, which can improve the safety of the driverless vehicle.

In addition, the embodiments of the present disclosure also provide a computer readable storage medium having a computer program stored thereon, and when the computer program is executed by a processor, the method for camera calibration processing according to any one of the above method embodiments is implemented.

In the embodiments according to the present disclosure, it should be understood that the disclosed apparatuses and methods may be implemented in other manners. For example, the apparatus embodiments described above are merely illustrative. For example, the division of the unit is only a division of logical functions. In actual implementations, there may be another division manner, for example, multiple units or components may be combined or integrated into another system, or some features can be omitted or not executed. In addition, the mutual coupling or direct coupling or communication connection shown or discussed may be an indirect coupling or communication connection through some interfaces, devices or units, and may be in an electrical, a mechanical or other form.

The units described as separate components may or may not be physically separated, and the components illustrated as units may or may not be physical units, that is, may be located in one place, or may be distributed to multiple network units. Some or all of the units may be selected according to actual needs to achieve the purpose of the solutions of the embodiment.

In addition, various functional units in various embodiments of the present disclosure may be integrated into one processing unit, or various units may exist physically separately, or two or more units may be integrated into one unit. The above integrated units may be implemented in the form of hardware or in the form of hardware and software functional units.

The above-described integrated unit implemented in the form of a software functional unit can be stored in a computer readable storage medium. The above software functional unit is stored in a storage medium and includes several instructions to cause a computer device (which may be a personal computer, a server, or a network device, etc.) or a processor to perform some of the steps of the methods of the various embodiments of the present disclosure. The above-mentioned storage medium includes: a U disk, a mobile hard disk, a read-only memory (ROM), a random access memory (RAM), a magnetic disk, or an optical disk, etc., which can store program codes.

A person skilled in the art can clearly understand that for the convenience and brevity of the description, the division of each functional module described above is only for exemplifying. In practical applications, the above functions may be assigned to be implemented by different functional modules as needed, that is, the internal structure of the apparatus is divided into different functional modules to perform all or part of the functions described above. For the specific working processes of the apparatuses described above, reference can be made to the corresponding processes in the foregoing method embodiments, which will not be repeated herein.

Other embodiments of the disclosure are readily apparent to those who skilled in the art, after the specification is taken into account and the disclosure disclosed herein is practiced. The present disclosure is intended to cover any variations, uses, or adaptations of the present disclosure, which are in accordance with the general principles of the disclosure and include common knowledge or common technical means in the art that are not disclosed in the present disclosure. The specification and embodiments are regarded as illustrative only, the true scope and spirit of the disclosure are pointed out by the following claims.

It should be understood that, the present disclosure is not limited to the specific structures described above and illustrated in the drawings, and various modifications and changes can be made without departing from the scope thereof. The scope of the disclosure is limited only by the appended claims.

What is claimed is:

1. A method for camera calibration processing, comprising:
    acquiring, during a process of a vehicle travelling along a straight line, at least one pair of images collected by a camera, and a vehicle position at a collection time of each of the images, wherein each pair of images comprises images taken by the camera at two different positions, and two images in each pair of images comprise a common static feature point;
    calculating a current installation angle of the camera, according to the at least one pair of images and the vehicle position at the collection time of each of the images;
    determining whether an installation angle error of the camera is within a preset error range; and
    taking a preset processing measure, when the installation angle error of the camera is not within the preset error range;
    wherein the acquiring, during a process of a vehicle travelling along a straight line, at least one pair of images collected by a camera comprises:
    acquiring original data collected by the camera, during the process of the vehicle travelling along the straight line; and
    sampling the original data according to a preset sampling frequency to acquire the at least one pair of images, wherein each pair of images comprises images sampled at two different sampling times, and the two images in each pair of images comprise the common static feature point;
        wherein the sampling the original data according to a preset sampling frequency to acquire the at least one pair of images comprises:
            sampling the original data according to the preset sampling frequency to acquire 2N images, wherein N is a positive integer; and dividing the 2N images into N pairs to acquire N pairs of images, wherein each pair of images comprises images sampled at two adjacent sampling times, and two images in each pair of images comprise the common static feature point; or
            repeating sampling processing on the original data for N times to acquire N pairs of images, wherein N is a positive integer, and wherein the sampling processing comprises: sampling out one pair of images from the original data, wherein a time interval between collection times of the pair of images is less than a preset time threshold, so that the pair of images comprises the common static feature point.

2. The method according to claim 1, wherein the taking a preset processing measure, when the installation angle error of the camera is not within the preset error range comprises:
    controlling the vehicle to issue warning information, when the installation angle error of the camera is not within the preset error range.

3. The method according to claim 1, wherein the acquiring, during a process of a vehicle travelling along a straight line, a vehicle position at a collection time of each of the images comprises:
    acquiring vehicle positioning data collected by a positioning apparatus in real time, during the process of the vehicle travelling along the straight line; and
    determining the vehicle position at the collection time of each of the images, according to the collection time of each of the images and the vehicle positioning data collected by the positioning apparatus in real time.

4. The method according to claim 1, wherein the calculating a current installation angle of the camera, according to the at least one pair of images and the vehicle position at the collection time of each of the images comprises:
    calculating an installation angle of the camera respectively according to each pair of images and the vehicle position at the collection time of each of the images, to obtain at least one installation angle of the camera; and
    calculating an average value of the at least one installation angle, to obtain the current installation angle of the camera.

5. A system, comprising:
    a memory, a processor, and a computer program stored on the memory and executable on the processor, wherein the computer program when being executed by the processor, causes the processor to:
    acquire, during a process of a vehicle travelling along a straight line, at least one pair of images collected by a camera, and a vehicle position at a collection time of each of the images, wherein each pair of images comprises images taken by the camera at two different positions, and two images in each pair of images comprise a common static feature point;
    calculate a current installation angle of the camera, according to the at least one pair of images and the vehicle position at the collection time of each of the images; and
    determine whether an installation angle error of the camera is within a preset error range; and
    take a preset processing measure, when the installation angle error of the camera is not within the preset error range;
    wherein the computer program further causes the processor to:
    acquire original data collected by the camera, during the process of the vehicle travelling along the straight line; and
    sample the original data according to a preset sampling frequency to acquire the at least one pair of images, wherein each pair of images comprises images sampled at two different sampling times, and the two images in each pair of images comprise the common static feature point; wherein the computer program further causes the processor to:
    sample the original data according to the preset sampling frequency to acquire 2N images, wherein N is a positive integer; and divide the 2N images into N pairs to acquire N pairs of images, wherein each pair of images comprises images sampled at two adjacent sampling times, and two images in each pair of images comprise the common static feature point; or
    repeat sampling processing on the original data for N times to acquire N pairs of images, wherein N is a positive integer, and wherein the sampling processing comprises: sampling out one pair of images from the original data, wherein a time interval between collection times of the pair of images is less than a preset time threshold, so that the pair of images comprises the common static feature point.

6. The system according to claim 5, wherein the computer program further causes the processor to:
    acquire vehicle positioning data collected by a positioning apparatus in real time, during the process of the vehicle travelling along the straight line; and
    determine the vehicle position at the collection time of the data of each of the images, according to the collection time of the data of each of the images and the vehicle positioning data collected by the positioning apparatus in real time.

7. The system according to claim 5, wherein the computer program further causes the processor to:
    calculate an installation angle of the camera respectively according to each pair of images and the vehicle position at the collection time of each of the images, to obtain at least one installation angle of the camera; and
    calculate an average value of the at least one installation angle, to obtain the current installation angle of the camera.

8. A non-transitory computer readable storage medium, having a computer program stored thereon,
    wherein the computer program when being executed by a processor, causes the processor to:
    acquire, during a process of a vehicle travelling along a straight line, at least one pair of images collected by a camera, and a vehicle position at a collection time of each of the images, wherein each pair of images comprises images taken by the camera at two different positions, and two images in each pair of images comprise a common static feature point;
    calculate a current installation angle of the camera, according to the at least one pair of images and the vehicle position at the collection time of each of the images; and
    determine whether an installation angle error of the camera is within a preset error range; and
    take a preset processing measure, when the installation angle error of the camera is not within the preset error range;
wherein the computer program further causes the processor to:
    acquire original data collected by the camera, during the process of the vehicle travelling along the straight line; and
    sample the original data according to a preset sampling frequency to acquire the at least one pair of images, wherein each pair of images comprises images sampled at two different sampling times, and the two images in each pair of images comprise the common static feature point; wherein the computer program further causes the processor to:
    sample the original data according to the preset sampling frequency to acquire 2N images, wherein N is a positive integer; and divide the 2N images into N pairs to acquire N pairs of images, wherein each pair of images comprises images sampled at two adjacent sampling times, and two images in each pair of images comprise the common static feature point; or
    repeat sampling processing on the original data for N times to acquire N pairs of images, wherein N is a positive integer, and wherein the sampling processing comprises: sampling out one pair of images from the original data, wherein a time interval between collection times of the pair of images is less than a preset time threshold, so that the pair of images comprises the common static feature point.

9. The non-transitory computer readable storage medium according to claim 8, wherein the computer program further causes the processor to:
    control the vehicle to issue warning information, when the installation angle error of the camera is not within the preset error range.

10. The non-transitory computer readable storage medium according to claim 8, wherein the computer program further causes the processor to:
    acquire vehicle positioning data collected by a positioning apparatus in real time, during the process of the vehicle travelling along the straight line; and
    determine the vehicle position at the collection time of each of the images, according to the collection time of each of the images and the vehicle positioning data collected by the positioning apparatus in real time.

11. The non-transitory computer readable storage medium according to claim 8, wherein the computer program further causes the processor to:
    calculate an installation angle of the camera respectively according to each pair of images and the vehicle position at the collection time of each of the images, to obtain at least one installation angle of the camera; and
    calculate an average value of the at least one installation angle, to obtain the current installation angle of the camera.

\* \* \* \* \*